TELEPHONE DIALING DEVICE

Filed Dec. 23, 1963 3 Sheets-Sheet 1

INVENTORS
THOMAS E. McCAY,
JAMES D. WARREN &
BY LADDIE M. ADAMS

E. Mickey Hubbard
ATTORNEY

INVENTORS
THOMAS E. McCAY,
JAMES D. WARREN &
BY LADDIE M. ADAMS

E. Mickey Hubbard
ATTORNEY

INVENTORS
Thomas E. McCay,
James D. Warren, &
Laddie M. Adams
BY
E. Mickey Hubbard
Attorney United States Patent Office 3,322,904
Patented May 30, 1967

3,322,904

TELEPHONE DIALING DEVICE

Thomas E. McCay, James D. Warren, and Laddie M. Adams, all of Norman, Okla., assignors to AVO Corporation, Norman, Okla., a corporation of Oklahoma Filed Dec. 23, 1963, Ser. No. 332,725
5 Claims. (Cl. 179—90)

The present invention relates to a device for selectively producing an electrical signal having a predetermined number of pulses occurring at predetermined time intervals and more particularly, but not by way of limitation, relates to a device for selectively dialing any one of a plurality of telephone numbers.

As is well-known in the art, there are many control functions which can be performed by an electrical control signal having a predetermined program of pulses. Probably the most common example of this type of control signal is the pulse signal used to dial a telephone. The telephone number 876, for example, is dialed by successively interrupting the telephone circuit eight, seven and six times in quick succession with a relatively long pause between each series of interruptions.

In many businesses, a large number of telephone calls must be made in the course of the day and in most cases these calls are limited to one or more of twenty or thirty numbers. Many devices have been devised for assisting in quickly finding the proper number for manual dialing. However, the caller must still manually dial the phone, which is bothersome and time consuming. In order to reduce the inconvenience and time consumed in both finding and dialing the numbers manually, several highly sophisticated devices have been proposed for both easily selecting the appropriate number and for then automatically dialing the number. However, insofar as it is known, all of these devices which have proved feasible from a mechanical and technical standpoint are also highly complicated and therefore relatively expensive.

Therefore, it is an object of the present invention to provide a device of the type described which is particularly adapted for quickly, easily and accurately dialing any one of a plurality of telephone numbers, yet which is relatively simple and can be economically manufactured.

Another object of the present invention is to provide a device of the type described which is relatively compact and which will occupy a minimum of desk space in addition to a standard telephone.

Still another object of the present invention is to provide a device of the type described wherein the telephone numbers programmed in the device can be easily and economically changed.

Another object of the present invention is to provide a device of the type described which may be quickly and easily used in combination with any telephone equipped with a standard plug and wall jack.

Still another object of the present invention is to provide a device of the type described which can be operated merely by moving a selector along a conspicuously displayed number list to the desired number, lifting the telephone receiver from the cradle and pressing a dial button.

A still further object of the present invention is to provide a device of the type described which can be reprogrammed merely be dialing a telephone connected thereto.

Another object of the present invention is to provide a device of the type described using a simplified magnetic recording and playback device to generate the pulses.

Still another object of the present invention is to provide an improved circuit means for recording the program pulses on a magnetic belt.

Yet another object of the present invention is to provide a device of the type described which is very simple in construction and which can therefore be very economically manufactured, and which will have a long and trouble-free service life.

Many additional objects and advantages of the present invention will be evident to those skilled in the art from the following detailed description and drawings, wherein.

Figure 2:
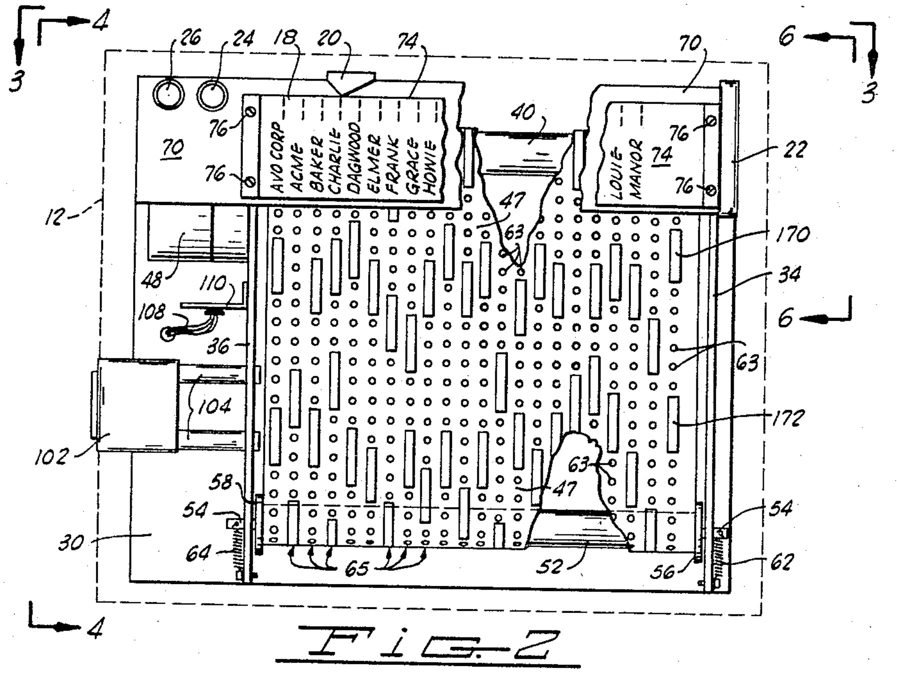
FIGURE 2 is a plan view of the device of FIGURE 1 with the housing removed so as to better illustrate the working parts thereof.

Referring now to the drawings, a device constructed in accordance with the present invention is indicated generally by the reference numeral 10. The device 10 comprises a housing 12 which may be fabricated from a decorative wood and which may be generally rectangular as illustrated. Suitable notches 14 may be provided in its upper face for receiving the four feet of a standard desk telephone. A number list display 18 is disposed on the right-hand side of the upper face adjacent to the telephone and contains a series of vertically oriented telephone numbers, as will hereafter be described in greater detail. A selector 20 is moveable along the number list 18 and a dial button 22 is provided at the lower end of the list 18. Red and white lights 24 and 26, respectively, are provided to indicate the condition of the dialing mechanism, as will be described in greater detail. Operation of the device to dial any one of a plurality of numbers simply entails moving the selector 20 to the desired number, lifting the receiver of the telephone 16 from the cradle, and pressing the dial button 22, as will hereafter be described in greater detail.

Referring now to FIGURES 2–6, wherein the housing 12 is indicated in dotted outline, the device 10 is comprised of a horizontally disposed base plate 30 having four support feet 32. A pair of parallel, upright support plates 34 and 36 are connected to the base plate 30 by angle members 38 and 39, respectively. An electrical contact drum 40 is disposed in a generally horizontal position and is connected to a suitable drive shaft (not illustrated) which extends through and is journaled in the upright support plate 36 and in the upright support plate 34. The contact drum 40 may conveniently be fabricated from a length of electrically-conductive tubular material which is keyed to the drive shaft previously mentioned but not illustrated by plastic inserts 44 and 46 which may also form guide shoulders for a program belt presently to be described. The drive shaft of the contact drum 40 is driven by a constant speed electric motor 48 and a suitable drive train 50. The conductive material of the drum 40 is connected to ground by any suitable means (not illustrated), as will hereafter be described in greater detail. A tension drum 52 is disposed generally parallel to the contact drum 40 and is journaled for rotation upon an axle 54 by a pair of plastic inserts 56 and 58, which also provide guide shoulders for the program belt member 47. The ends of the axle 54 extend through elongated slots 60 in the upright support plates 34 and 36, only the slot 60 in the support plate 36 being ilustrated in FIGURE 4. A pair of tension springs 62 nd 64 are connected to the ends of the axle 54 for maintaining the program belt 47 taut.

The program belt 47 is endless and passes around both he contact drum 40 and the tension drum 52. The program belt 47 is fabricated from any suitable flexible, nononductive material such as Mylar plastic or the like, and s provided with a plurality of rows of apertures 63 which orm a plurality of program tracks 65 disposed in sideoy-side relationship normal to the drums 40 and 52. The orogram tracks 65 are programmed to produce the desired equence of pulses by placing short strips of nonconluctive, adhesive tape over certain apertures, as will oresently be described in greater detail. Although the ilustrated construction of the belt 47 is the preferred emodiment because the belt 47 can be used over and over even though the programs of the various program tracks ire changed, it will be appreciated that the belt 47 could oe permanently perforated to provide the necessary aperures.

Figure 3:
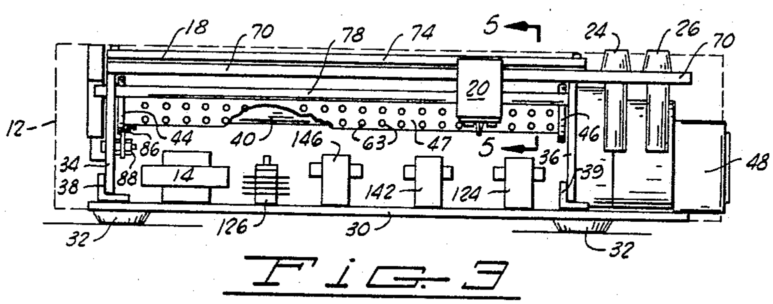
FIGURE 3 is a side elevational view taken substantially on lines 3—3 of FIGURE 2.
Figures 1, 4:
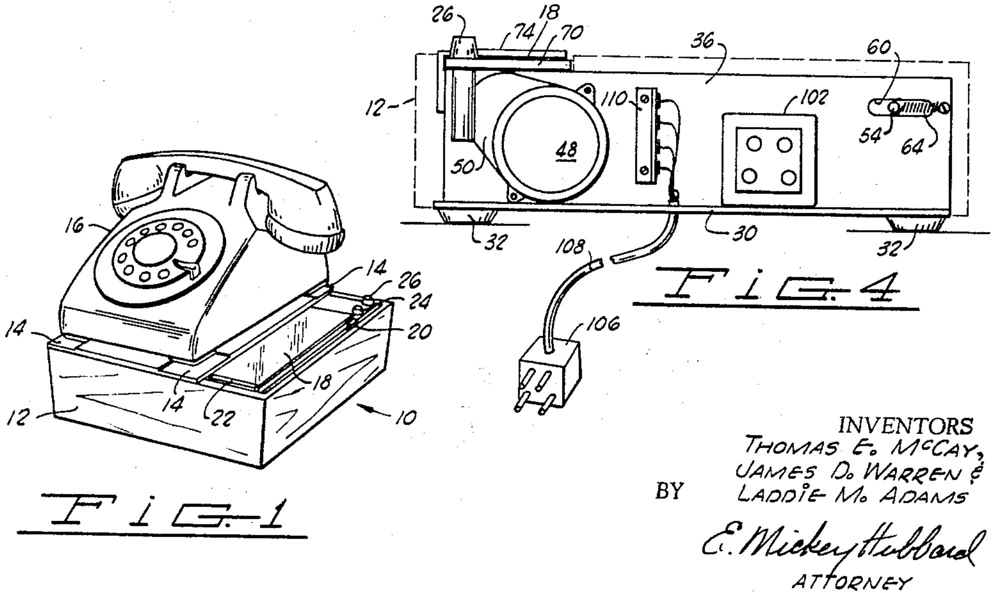
FIGURE 1 is a perspective view illustrating a device constructed in accordance with the present invention in combination with a standard telephone.
FIGURE 4 is a side elevational view taken substantially on lines 4—4 of FIGURE 2.
Figures 5, 6, 7:
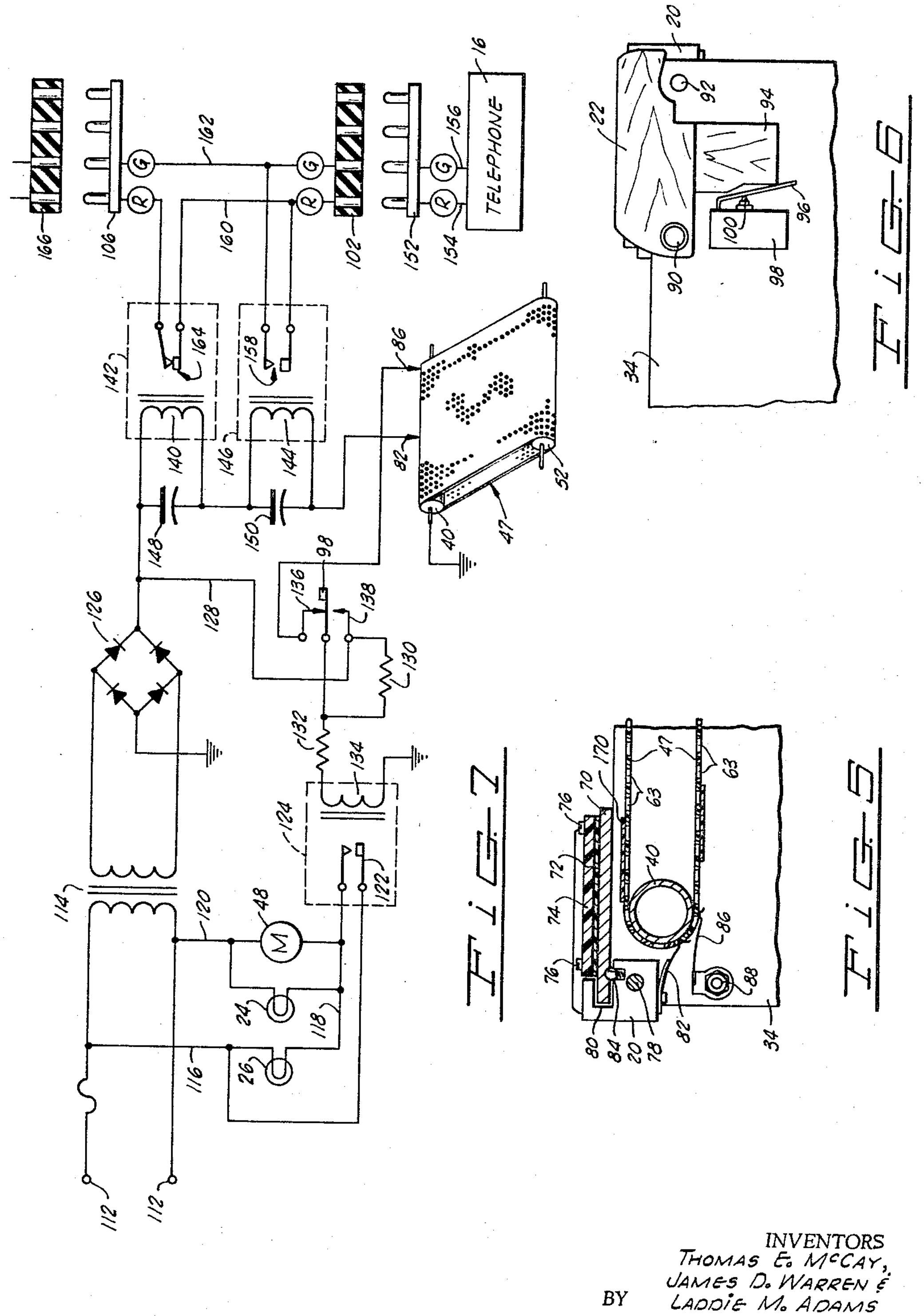
FIGURE 5 is a vertical sectional view taken substantially on lines 5—5 of FIGURE 3.
FIGURE 6 is a side elevational view taken substantially on lines 6—6 of FIGURE 2.
FIGURE 7 is a schematic circuit diagram of the device of FIGURE 1.

An easel plate 70 is connected across the top edges of he support plates 34 and 36, as best seen in FIGURE 3. An index list of the telephone numbers to be programmed on the belt 47 is typed on a sheet of paper or cardboard 72 and is held against the upper face of the easel plate 70 by a clear plastic plate 74 which may be conveniently connected to the easel plate 70 by four screws 76. The selector 20 is slidably connected to a rod 78 which is fixed to the upright support plates 34 and 36 and is disposed generally parallel to the contact drum 40. The selector 20 has a groove 80 which receives the edge of the easel plate 70 for guide purposes. A spring-like selector contact 82 is connected to the selector 20 and is biased against the surface of the contact drum 40, when permitted by an aperture in the program belt 47, to complete an electrical circuit which will hereafter be described in greater detail. The selector contact 82 may be placed in register with any one of the program tracks 65 by sliding the selector 20 along the rod 78. A suitable ball and detent mechanism, indicated generally by the reference numeral 84, is provided between the selector 20 and the under surface of the easel plate 70 for holding the selector 20 and therefore the selector contact 82 in register with any one of the program tracks 65, as will hereafter be described in greater detail. A second spring contact 86 is connected by a screw 88 to the upright support plate 34, as best seen in FIGURES 3 and 5, and is also biased into contact with the surface of the contact drum 40 when permitted by the program belt 47. In this regard, the program belt is provided with a single aperture which will pass under the second spring contact 86 to stop the travel of the belt 47 after one complete revolution, as will hereafter be described in greater detail. Thus it will be noted that the belt 47 is disposed between both the spring contacts 82 and 86 and the surface of the contact drum 40 to interrupt the electrical circuits of the contacts except when the respective spring contacts pass through the apertures in the program belt 47.

The dial button 22 is generally T-shaped, as illustrated in FIGURE 6, and is pivotally connected to the upright support plate 34 by a screw 90. A pin 92 is provided to limit the downward travel of the button 22 and the lower portion 94 is positioned to engage a leaf spring 96 which is connected to the body of a microswitch 98. Thus when the dial button 22 is depressed, the portion 94 will urge the leaf spring 96 against the microswitch actuating button 100 to start operation of the device as hereafter described. Upon release of the dial button 22, the spring 96 will permit the microswitch 98 to open once again. Of course any suitable switching means may be employed for this purpose.

A standard portable telephone jack 102 is connected by suitable brackets 104 to the upright support plate 36 and is provided for purposes which will hereafter be described in greater detail. A standard four-pronged plug 106 is connected by a lead wire 108 which may pass through the bottom plate 30 and be connected to suitable terminals of a terminal plate 110 which may also be secured to the upright support plate 36. As can best be seen in FIGURE 3, the red and white indicator lights 24 and 26 are secured to the easel plate 70 in a conventional manner.

Referring now to the circuit diagram of FIGURE 7, it will be noted that all components previously described are indicated by the same reference numerals. A conventional source of A.C. power is connected across the terminals 112 and therefore across the primary winding of the transformer 114. The drive motor 48 is connected through a high impedance white neon lamp 26 directly across the input power terminals 112 by means of conductors 116, 118 and 120. The impedance of the neon lamp 26 is sufficiently high that the motor 48 will not operate when connected in this manner. The contacts 122 of a relay 124 are connected in shunt around the neon lamp 26 so that when closed the motor 48 will be operated. The red neon lamp 24 is connected in shunt around the motor 48 and is of such impedance when compared to the impedance of the motor 48 as to be illuminated whenever the contacts 122 are closed.

A rectifier circuit 126 is connected across the secondary winding of the transformer 114. The output from the rectifier 126 is connected through a conductor 128 to first and second resistors 130 and 132 and finally to the control coil 134 of the relay 124. The microswitch 98 which is actuated by depression of the dial button 22 is a two-position switch having contacts 136 and 138. The normally closed contact 136 is connected to the second spring contact 86 which, as previously described, is biased against either the program belt 47 or the surface of the drum 40. Thus when the microswitch 98 is in the normal position, the coil 134 is shunted through the contact 136 to the contact 86, provided the contact 86 is in contact with the contact drum 40 which is connected to ground. The normally open contact 138 is connected to the conductor 128 and therefore is connected directly to the output of the rectifier 126 so that when the microswitch 98 is actuated, the resistor 130 will be shunted and sufficient current will pass through the coil 134 to actuate the relay 124, close the contacts 122 and start the drive motor 48. When the dial button 22 is released and the microswitch 98 returns to the contact 138, the spring contact 86 will be open due to movement of the belt 47 and sufficient current will continue to pass through the resistors 130 and 132 and the coil 134 to maintain the contacts 122 closed until the shunt circuit through the contact 86 is again completed. A single aperture is provided in the program belt 47 over its entire length which will pass under the contact 86. Therefore, as will hereafter be described in greater detail, the spring contact 86 will contact the drum 40 only one time as the entire length of the belt 47 passes the contact.

The output from the rectifier circuit 126 is also connected to a circuit including the coil 140 of a dialing relay 142, the coil 144 of a muting relay 146 and the spring contact 82 which, it will be recalled, is carried by the selector 20. A capacitor 148 is connected in shunt with the coil 140 and a capacitor 150 is connected in shunt with the coil 144 for purposes which will hereafter be described in greater detail.

As illustrated, the telephone 16 is provided with a standard four-pronged plug 152 which can be inserted in the standard wall jack 102. Only the wires 154 and 156, respectively, extend from the telephone 16 to the plug 152. The contacts 158 of the muting relay 146 are normally open, i.e., are open when the coil 140 is not energized, and are connected across the wires 160 and 162, respectively. The contacts 164 of the dialing relay 142 are normally closed and are connected in the conductor 160 between the jack 102 and the plug 106. Thus it will be noted that the contacts 158 of the muting relay 146 are connected in shunt around the telephone 16, while the contacts 164 of the dialing relay 142 are connected to open and close the main telephone circuit. The plug 106 is then connected in any conventional wall jack 166 which in turn is connected to the standard telephone system.

The device 10 is programmed to automatically dial any one of a plurality of desired telephone numbers, by covering a predetermined number and sequence of the apertures 63 of each of the program tracks 65. For example, assume that the telephone number 567-6543 is to be programmed on one of the program tracks 65. Beginning at some starting point, as determined by the single aperture which passes under the contact 86, the first five apertures are left open, then a suitable number of apertures, usually three, are covered by a strip of adhesive, nonconductive tape 170 to provide the necessary time delay between digits. The next six apertures 63 are left uncovered and the next three apertures are covered by a second strip of tape 172. Then seven apertures are left uncovered, three are covered, six are uncovered, three are covered, etc., so that a number of apertures corresponding to the number to be programmed are provided between each strip of tape covering three apertures. The names corresponding to the telephone numbers programmed on the program tracks 65 are then printed on the sheet 72 and fixed under the clear plastic sheet 74 such that when the pointer of the selector 20 is positioned opposite each of the names, the selector contact 82 will be aligned with the corresponding program track 65 on which the correct telephone number is programmed.

After all of the program tracks 65 are programmed in this manner, the terminals 112 of the device 10 are plugged into a standard A.C. wall receptacle and the standard four-pronged plug 152 of the telephone 16 is inserted in the jack 102 of the device 10. The plug 106 of the device 10 is then inserted in the telephone wall jack 166 and thereby connected to the remainder of the telephone system. Then any desired telephone number can be dialed merely by moving the selector 20 to a point opposite the name on the sheet 72, lifting the receiver from the cradle, and pressing the dial button 22. When the dial button 22 is depressed, the microswitch 98 is moved downwardly against the contact 138 opening the shunting circuit through the contact 136 and spring contact 86 and the D.C. power from the rectifier 126 is passed through the coil 134 of the relay 124 to close the contacts 122. Upon closing of the contacts 122, the high impedance white neon lamp 26 is shunted and the motor 48 operated by power current passing through the conductor 116, the contacts 122, the motor 48 and the conductor 120. At the same time, the red neon indicator lamp 24 which is connected in shunt around the motor 48 will also be illuminated to indicate that the device is in the dialing mode and is now ready for use. As the motor 48 begins to turn, the program belt 47 will be driven and will pass between the contact drum 40 and the spring contact 86 to permanently open the shunting circuit through the contact 136 so that the dial button 22 need be only momentarily depressed. In this regard, it will be appreciated that a single aperture (not illustrated) is provided in the belt 47 along the track traveling under the contact 86 so that the motor 48 will continue to run until the belt 47 has traveled its entire length one time.

As the belt 47 is driven by the contact drum 40, the contact 82 will pass through each uncovered aperture 63 in the belt 47 of the particular program track and will momentarily make contact with the contact drum 40 to complete the circuit from the rectifier 126 through the coils 140 and 144 of the dialing and muting relays 142 and 146, respectively. Thus as the contact 82 passes through a series of apertures and makes contact with the contact drum 40, a series of pulses will be passed through the coils 140 and 144. The capacitor 148 is chosen to produce a proper pulse length as required by the telephone company standards and insure that each pulse will operate the dialing contacts 164. At the same time, the capacitor 148 prevents extraneous noise, such as might be caused by bouncing of the contact 82 or by dust which may collect on the drum 40, from falsely actuating the dialing contacts 164. On the other hand, the capacitor 150 is selected so that the series of quick pulses generated by a sequence of open apertures 63 in the particular program track will be smoothed out and presented as a single pulse to the muting relay coil 144 with the result that the muting relay contacts 158 will be maintained closed as the series of pulses surge through the circuit. In this regard, the capacitor 150 can be selected so that even the contacts 158 will remain closed during the delay period caused by the three closed apertures between each of the pulse sequences or can, if desired, be selected so that the contacts will remain closed only during the period when the series of pulses for each number are being generated. Thus it will be appreciated by those skilled in the art that as the belt 47 is driven and the pulses generated, the contacts 158 will be closed to shunt the telephone out and eliminate any unpleasant popping in the receiver of the telephone in accordance wtih standard telephone company practices. At the same time, each pulse resulting from completion of the dialing circuit through the contact 82 will open the dialing relay contacts 164 and thereby open the telephone circuit formed by the conductors 160 and 162 so that the number programmed on the respective program track 65 will be dialed by a pulse signal in the telephone circuit. It will also be appreciated by those skilled in the art that a two-wire type telephone hookup is illustrated in FIGURE 7. Thus it will be evident that in the event a four-wire hookup is being used, as will sometimes be the case, the shunting contacts 158 will still be connected in shunt around the receiver of the telephone, and the dialing contacts 164 will be connected in series in the principal telephone circuit and will function in substantially the same manner.

The apertures in the program track which are not used are covered by a strip of adhesive tape so that as soon as the number is dialed, the muting relay contacts 158 will open and the telephone will be ready for use when the party being dialed answers. However, the motor 48 will continue to run until the belt 47 has made one complete pass and the single aperture (not illustrated) again passes under the spring contact 86. At this point the coil 134 will be shunted through the contacts 136 of the microswitch 98, the spring contact 86, and through the contact drum 40 to ground. The contacts 122 will then open and the motor 48 will cease to operate. The red indicator light 24 will go out and the white indicator light 26 will be illuminated to indicate that the device is ready for use. Further, the belt 47 will be stopped in position for the next dialing sequence. When it is desired to dial another number, the selector 20 is merely moved to the desired name, the receiver lifted from the cradle and the dial button 22 pressed. The above described sequence will then be repeated to dial the particular number programmed on the program track corresponding to the name on the index sheet 72 opposite the selector 20.

From the above detailed description of one embodiment of the present invention, it will be evident that a highly useful device for generating any one of a plurality of programmed electric signals has been described. The device is primarily electro-mechanical, is very simple so as to be economically manufactured and to have a long service life, and is exceedingly easy to operate. In one embodiment of the device, thirty-nine separate program tracks were provided on the belt 47 and each program track was sufficiently long to accommodate a total of ten digits each having nine pulses. The device was geared to operate at a speed of approximately 100 milliseconds per pulse so that the dialing operation was completed at as high a rate as possible for the particular telephone system, hich is at a considerably greater rate than can be ac-
ımplished manually. Further, once the device is properly ·ogrammed, the numbers are dialed with great accuracy. ven more importantly, the numbers to be dialed are very ›nveniently arranged and easily found, and once the aling mechanism is initiated the dialer is free to perform her tasks until the dialing is complete. These small savgs in time and convenience can be extremely important situations where a large number of telephone calls are ade in the course of a day. It will be evident to those illed in the art that the device 10 can be used to generate ı electric pulse signal for substantially any control funcon and accordingly will have considerable utility in other elds of technology.

Another embodiment of the present invention employg a magnetic record belt 200 and a magnetic recording ıd reproducing head 202 is illustrated schematically in IGURE 8. The embodiment disclosed in FIGURE 8 ilizes substantially the same mechanical components the embodiment 10 except that the apertured belt 47 replaced by the magnetic record belt 200, and the selecır contact 82 is replaced by the recording and reproducıg head 202. The capacitors 148 and 150 are replaced by suitable driving circuit as will presently be described. [owever, the dialing relay 142 and the muting relay 146 re used. The drive motor 48 for driving the roller 40 and ıerefore the magnetic record belt 200 is used in the device f FIGURE 8. The circuitry for controlling the operation f the motor 48 in such a manner as to automatically rive the belt 200 through one complete revolution is also etained. Accordingly, the magnetic record belt 200 is rovided with an aperture for permitting the contact 86 to ngage the roller 40 and shunt the holding relay 124 as reviously described. Additional controls are provided for perating the motor 48 when the magnetic record belt 200 programmed, as will hereafter be described in greater etail.

The dialing relay 142 and the muting relay 146 are onnected in the telephone instrument circuitry in subtantially the same manner as described in connection vith the dialing device 10 by a multi-contact mode witch 204 having contacts 204*a*, 204*b*, 204*c*, 204*d*, 204*e* nd 204*f*. As illustrated, the mode switch 204 is in the dialing" position, rather than in the "program" posiion. Thus it will be noted that the dialing contacts 164 f the dialing relay 142 are connected in series with the ialing contacts 206 of the telephone 16 by means of the onductor 208, switch blade 204*a*, conductor 210 and onductor 212. The conductor 214 illustrated in dotted utline is broken when connecting the dialing device to standard telephone so as to provide the series conection.

Similarly, the contacts 158 of the muting relay 146 are onnected in parallel with the muting relay 216 of the elephone 16 by conductor 218, switch blade 204*c*, conluctor 220, conductor 222, switch blade 204*d* and conluctor 224. In this instance, the conductor 226 of the tandard instrument circuitry has been broken to provide he desired parallel connection. At this time it should e pointed out that the muting contact 216 of the tele›hone instrument circuitry is normally open, but closes he instant the manual dial is moved from the "at rest" osition and remains closed until such time as the dial eturns to the "at rest" position.

The playback circuit for operating the relays 142 and 46 and dialing the telephone as hereafter described is omprised of the resistor 230, the recording and reprolucing head 202, the switch blade 204*e* of the mode witch 204, an amplifier 232 of any suitable design, and monostable multivibrator 234 for producing a single ›ulse of predetermined amplitude and duration in re-ponse to each pulse received. The output from the multiibrator 234 is connected by a conductor 236 to an integrator circuit 238 of conventional design which conerts a quick succession of pulses from the multivibrator to a single pulse. The first driver amplifier 240 of conventional design amplifies the pulse and energizes the coil 140 of the muting relay 146 in such a manner as to close the contacts 158 and thereby shunt out the receiver of the telephone 16 as previously described. The output from the multivibrator 234 is also applied by the conductor 242 to a second driver amplifier 244 which reproduces each of the pulses from the multivibrator and applies them to the coil 140 of the dialing relay 142. The combined effect of the multivibrator and second driver amplifier is such as to cause the dialing contacts 164 to open in response to each separate pulse from the multivibrator. This opens the dialing circuit of the telephone 16 in such a manner as to dial the appropriate digits, as will presently be described in greater detail.

An important aspect of the present invention is that the telephone 16 is used to program the various program tracks on the magnetic record belt 200. This is accomplished by throwing the mode switch 204 to the program position, which is the position other than that illustrated in FIGURE 8. When in the program position, a recording circuit is formed from the dialing contacts 206 of the telephone 16 to the recording and reproducing head 202 by means of the conductor 250, switch blade 204*a*, conductor 208, the dialing contacts 206, conductor 252, switch blade 204*b*, conductor 254 and switch blade 204*e* to one side of the recording and reproducing head 202. This circuit is substantially free from resistance and forms one leg of a bridge circuit in which the coil of the recording and reproducing head 202 forms the bridge. The other three legs of the bridge circuit are comprised of the resistor 230 and the resistors 256 and 258 which are connected by switch blade 204*f* of the mode switch 204 to a negative voltage source. This novel bridge recording circuit provides a means for producing maximum flux change each time that the dialing contact 206 of the telephone 16 is opened or closed.

When the contacts 204*c* and 204*d* are switched to the program mode, the muting contact 216 of the telephone 16 is connected in series with the motor 48 across the power source terminals 112 by the circuit comprised of conductor 260, switch blade 204*c*, conductor 218, the muting contact 216, conductor 262, switch blade 204*d*, conductor 264 and conductor 266. Thus when the normally opened muting contact 216 is closed, the motor 48 will be energized and the record belt 200 moved past the recording and reproducing head 202 as will hereafter be described. It will also be noted that the motor 48 can also be energized by closing the relay 124 so as to be operated during the dialing sequence in the manner previously described, and also to assist in the programming procedure as will presently be described.

Figure 8:
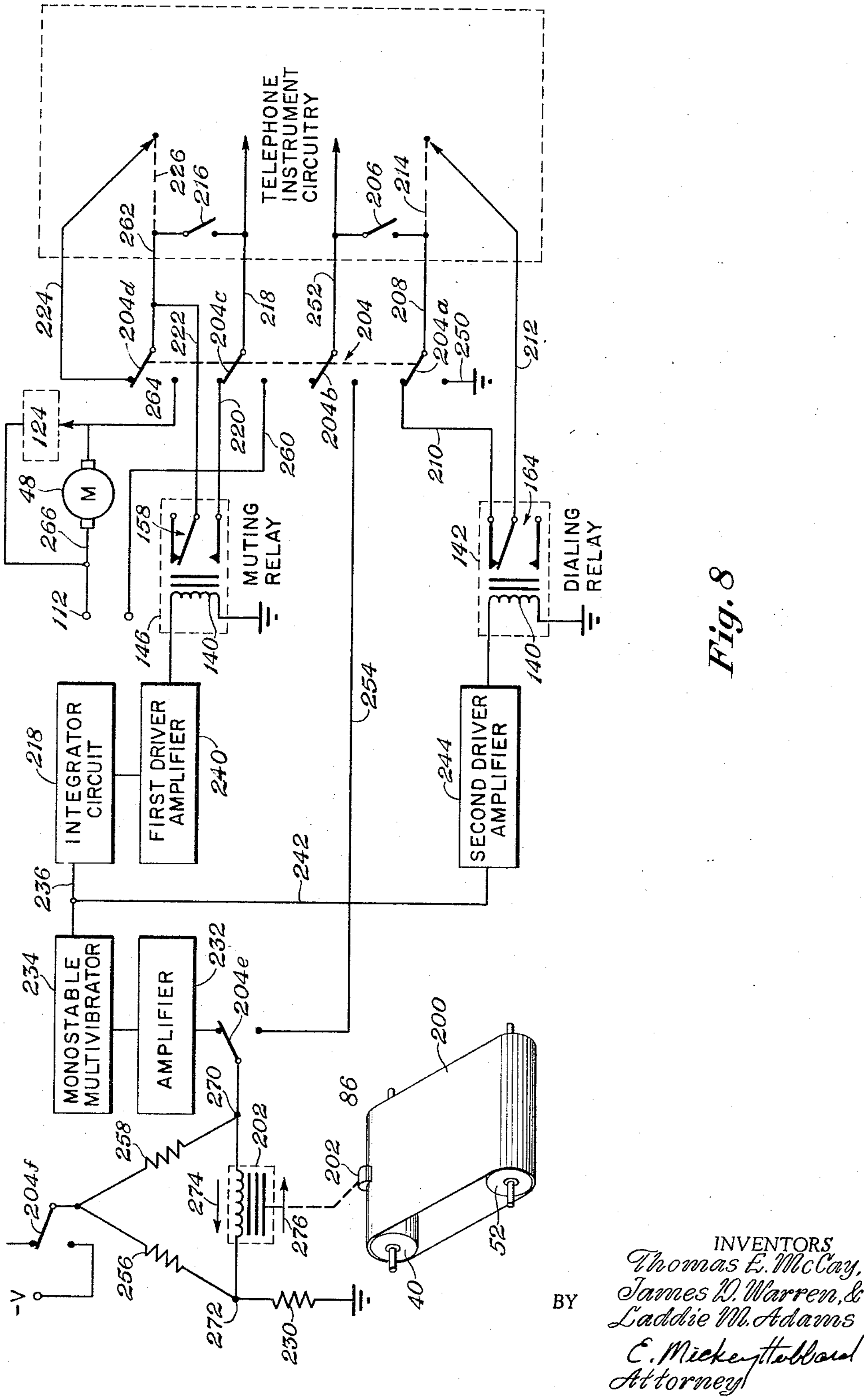
FIGURE 8 is a circuit diagram of another embodiment of the present invention employing a magnetic record and playback system.

In operation, the embodiment of FIGURE 8, is programmed to dial the desired telephone numbers in the following manner. First the selector 20 is moved to the appropriate track on the magnetic record belt 200 so that the recording and reproducing head 202, which of course is connected to the selector 20, is moved adjacent to the appropriate record track on the magnetic belt 200. The mode switch 204 is then moved to the program position so that the switch blades 204*a*–204*f* are moved to the positions other than the positions illustrated in FIGURE 8. The number which is to be programmed onto the selected program track is then manually dialed on the standard telephone 16. The instant the manual dial is moved from the "at rest" position, the muting contact 216 is closed to complete the circuit to the drive motor 48 and the record belt 200 starts to move past the recording head 202. Thus it will be appreciated that the belt 200 moves a short distance during the period of time required to manually move the telephone dial to the appropriate number. When the dial is released, the dialing contact 206 is opened a number of times corresponding to the particular digit being programmed on the belt. For example, if the number 5 has been dialed, the contacts 206 will be opened 5 times in quick succession.

When the contact 206 is closed, the junction 270 is essentially short-circuited to ground. On the other hand, the junction 272 is at some voltage value between zero and the negative voltage connected through the switch blade **204*f*. Therefore, conventional current will flow in the direction of the arrow 272 through the recording and reproducing head 202. Each time that the dialing contact 206 opens, the voltage across the recording and reproducing head 202 will be reversed, and conventional current will flow in the direction of the arrow 276 because of the parallel paths from between the junction 272 and the voltage supply by the resistor 256 on the one hand, and the head 202 and the resistor 258 on the other. Therefore, the magnetic flux induced by the recording and reproducing head 202 will be completely reversed from the peak value of one polarity to the peak value of the other polarity. Of course the change in flux is the value which is recorded on the record belt 200**.

When the dial has returned to the "at rest" position, a number of pulses corresponding to the particular digit dialed will have been recorded on the selected program track of the record belt 200. As the dial reaches the "at rest" position, the muting contact 216 is again opened and the motor 48 de-energized to stop movement of the belt 200. Each successive digit of the telephone number is then dialed in the conventional manner and the corresponding number of pulses are successively recorded on the record belt 200. An important aspect of the invention is that the pulse sequences for the various digits are recorded on the record belt in the proper spaced relationship without regard to the rate at which the telephone number is dialed. The spacing between the pulse sequences for the respective digits is obtained by the fact that the motor 48 starts to move the belt 200 at the instant the dial is moved from the "at rest" position and by any coasting of the belt 200 after the motor 48 is de-energized. Therefore, even if the digits are not dialed in rapid sequence, the record belt 200 is automatically stopped between the dialing of each digit and the proper length pause between pulse sequences established.

After the number is dialed, the program track will usually have some space left at the end before reaching the index position where the contact 86 operates to de-energize the motor 48 during the normal dialing operation. The remainder of the program track can be erased to eliminate old numbers and record belt 200 can be returned to the index position merely by pressing the dial button 22 so as to actuate the relay 124 and energize the motor 48. Then the belt continues to the index position with the recording voltage applied to the recording and reproducing head 202 so as to erase the remainder of the track and insure that no false signals will be subsequently generated. Of course each successive program track corresponding to the several numbers on the list 74 can be sequentially programmed, or the number on any program track can be changed by the procedure described above.

After the record belt 200 has been programmed, the mode switch 204 is switched to the "dial" position as illustrated in FIGURE 8. The contacts 164 of the dialing relay are then connected in series with the dialing contacts 206 of the telephone, and the contacts 158 of the muting relay are connected in parallel with the muting contacts 216 of the telephone. Then the operation of the dialing device disclosed in FIGURE 8 is the same as that of the device 10 from an operational standpoint. For example, the selector 20 is moved opposite the appropriate name on the list 74. The recording and reproducing head 202 will then be positioned adjacent the appropriate program track on the record belt 200 by movement of the selector 20. The telephone receiver is then lifted from the hook and the dial button 22 is pressed to close the relay 124, energize the motor 48 and start the belt 200 moving as previously described in connection with the device 10. As the impulses recorded on the program track move past the recording and reproducing head 202, electrical pulses are generated in the head which are amplified by the amplifier 232 and passed on to the monostable multivibrator 234. The individual pulses generated by the multivibrator 234 are then applied to the second driver amplifier 244 which actuates the dialing relay 142 in such a manner as to cause interruption of the main telephone circuit in the appropriate sequence to dial the number.

At the same time the series of pulses generated by the multivibrator 234 are integrated by the integrating circuit 238 to produce a single pulse having a duration corresponding to the total duration of the series of pulses, and the single pulse is amplified by the first driver amplifier and applied to the coil 140 to close the muting contacts 158 and shunt the transmitter and receiver of the telephone during the dialing sequence. As soon as the sequence of pulses has ceased, the telephone is ready for immediate use because the shunting contacts 158 open. The motor 48 continues to run until the record belt 200 returns to the reference position and the aperture (not illustrated) in the record belt 200 registers with the contact 86. This completes the shunting circuit to de-energize the relay 124 and stop the motor 48. The device is then ready for immediate use to dial another number by the same procedure.

From the above detailed description, it will be evident that a novel device for dialing a telephone by means of a magnetic recording medium has been disclosed. The device is particularly simple because the dialing contacts and the muting contacts of the standard telephone are used for the programming of the telephone numbers on the record belt. The programming procedure is extremely simple and can easily be accomplished by the average person, because the program procedure merely entails setting the mode switch 204 in the program position, dialing the number on the telephone, pressing the dial button to erase the remainder of the program track and return the record belt to the index position, and moving the mode switch 204 back to the dial position. The programming circuit described utilizes a novel bridge network to obtain the maximum flux reversal for impressing a maximum pulse on the magnetic record belt for any particular recording voltage. Further the programming circuit is very simple and foolproof in that it employs only the dialing contacts and the muting contact of the telephone, the very simple circuitry for energizing the motor 48, and the simple bridge circuit around the recording and reproducing head 202.

Although several preferred embodiments of the present invention have been described in detail, it is to be understood that various changes, substitutions and alterations can be made therein without departing from the spirit and scope of the invention as defined by the appended claims.

What is claimed is:

1. A device for selectively dialing any one of a plurality of telephone numbers comprising:
   - support means;
   - an endless magnetic record belt connected to the support means;
   - a magnetic record-playback head means slidably connected to the support means for movement transversely of the record belt in operative position adjacent the record belt;
   - electrically-operated drive means for moving the endless record belt one complete revolution past the record-playback head means upon actuation; and,
   - circuit means operatively connected to the record-playback head means for interrupting a telephone circuit in accordance with a program recorded on the record belt, said circuit means comprising pulse forming means for producing an electrical pulse of uniform amplitude and duration each time the telephone circuit is to be interrupted, integration circuit means connected to receive the pulses from the pulse forming circuit means for producing a single electrical pulse having a duration corresponding to the duration of pulses representative of a single digit, a muting relay the coil of which is driven by the output of the integrator circuit means and the contacts of which are connectable in parallel with the muting contacts of the telephone, and a dialing relay the coil of which is connected to the pulse forming circuit means and the contacts of which are connectable in parallel with the dialing contacts of the telephone where a series of pulses are reproduced, the muting contacts will be closed for the duration of each series of pulses corresponding to a digit and the dialing contacts will be closed only during each individual pulse, whereby any one of a plurality of telephone numbers recorded on transversely spaced program tracks on the record belt can be selectively reproduced by moving the record-playback head to the selected track and actuating the electrically-operated means for moving the endless record belt.

2. A device for selectively dialing any one of a plurality of telephone numbers as defined in claim 1 further characterized by:

first programming circuit means operatively connected to the record-playback head means for selectively recording a pulse sequence on the program tracks on the record belt, the programming circuit means being adapted for connection to the dialing contacts of a telephone to record a series of electrical pulses produced by the dialing contacts when the telephone is dialed; and, second programming circuit means operatively connected to the electrically-operated drive means, the second programming circuit means being adapted for connection to the muting contacts of a telephone to energize the electrically-operated drive means and move the record belt past the record-playback head means each time a digit is dialed on the telephone, whereby each time a digit is dialed on the telephone, the muting contacts will close and the record belt will be immediately moved past the record-playback head means until the dialing pulse sequence is stopped and the muting contacts open, and a series of pulses will be recorded on the record belt corresponding to the digit dialed, and a space will be provided on the record track between the several pulse sequences for the several digits during the period of time required to move the dial from the "at rest" position to the position where the dial is released.

3. The combination as defined in claim 2 wherein:

the first programming circuit means is comprised of a bridge circuit in which the record-playback head means forms a diagonal of the bridge, resistors form three legs of the bridge, and circuit means for connecting the dialing contacts of the telephone in the fourth leg.

4. A device for selectively dialing any one of a plurality of telephone numbers on a telephone having a dialing mechanism with a set of dialing contacts for interrupting the telephone circuit a predetermined number of times for each digit dialed and having a set of muting contacts which close and shunt out a portion of the telephone circuit upon movement of the dialing mechanism from an "at rest" position, comprising:

a generally rectangular support means having a pair of spaced, parallel rollers disposed substantially at opposite sides of the support means and including a visible index disposed parallel to one of the rollers, an endless magnetic record belt extending around the pair of support rollers, a magnetic record-playback head means slidably connected to a bar positioned parallel to said one of the rollers and mounted on the support means so that the head means is movable transversely of the record belt in operative position adjacent the record belt, the head means including pointer means for indicating the position of the head relative to the visible index adapted to be manually gripped for sliding the head means along the bar, electrically-operated drive means connected to drive one of the rollers for moving the endless record belt one complete revolution past the record-playback head means upon actuation, and circuit means operatively connected to the record-playback head means for interrupting a telephone circuit in accordance with a program recorded on the record belt, whereby any one of a plurality of telephone numbers recorded on transversely spaced program tracks on the record belt can be selectively reproduced by moving the record-playback head to the selected track and actuating the electrically-operated means for moving the endless record belt.

5. The combination defined in claim 4 wherein the circuit means comprises pulse forming means for producing an electrical pulse of uniform ampltiude and duration each time the telephone circuit is to be interrupted, integration circuit means connected to receive the pulses from the pulse forming circuit means for producing a single electrical pulse having a duration corresponding to the duration of pulses representative of a single digit, a muting relay the coil of which is driven by the output of the integrator circuit means and the contacts of which are connectable in parallel with the muting contacts of the telephone, and a dialing relay the coil of which is connected to the pulse forming circuit means and the contacts of which are connectable in parallel with the dialing contacts of the telephone whereas a series of pulses are reproduced, the muting contacts will be closed for the duration of each series of pulses corresponding to a digit and the dialing contacts will be closed only during each individual pulse.

References Cited

UNITED STATES PATENTS

| | | | |
|---|---|---|---|
| 2,083,920 | 6/1937 | Powell | 323—75 |
| 2,355,567 | 8/1944 | Sparrow | 323—75 |
| 2,656,417 | 10/1953 | Kilburg | 179—90.1 |
| 2,921,142 | 1/1960 | Tinus | 179—90.2 |
| 2,941,043 | 6/1960 | Ham et al. | 179—90.2 |

KATHLEEN H. CLAFFY, *Primary Examiner.*

RICHARD MURRAY, *Examiner.*

J. W. JOHNSON, *Assistant Examiner.*